US007094269B2

(12) United States Patent
Yang

(10) Patent No.: US 7,094,269 B2
(45) Date of Patent: Aug. 22, 2006

(54) AIR PRE-CLEANER

(75) Inventor: Kee Young Yang, Jeonrabuk-do (KR)

(73) Assignee: Hyundai Motor Company, Seoul (KR)

( * ) Notice: Subject to any disclaimer, the term of this patent is extended or adjusted under 35 U.S.C. 154(b) by 294 days.

(21) Appl. No.: 10/750,676

(22) Filed: Dec. 31, 2003

(65) Prior Publication Data

US 2005/0066636 A1 Mar. 31, 2005

(30) Foreign Application Priority Data

Sep. 25, 2003 (KR) ..................... 10-2003-0066539

(51) Int. Cl.
*B01D 45/00* (2006.01)

(52) U.S. Cl. ........................... 55/423; 55/315; 55/319; 55/342; 55/385.3; 55/410; 55/428; 55/434; 123/198 E

(58) Field of Classification Search .................. 55/315, 55/319, 320, 342, 350.1, 385.3, 410, 428, 55/432, 433, 434, 462, 482, 495, 529, DIG. 28, 55/423; 123/198 E; 96/386
See application file for complete search history.

(56) References Cited

U.S. PATENT DOCUMENTS 3,721,069 A * 3/1973 Walker ...................... 55/385.3
4,080,184 A * 3/1978 Petersen ...................... 55/315
4,233,043 A * 11/1980 Catterson ...................... 55/315
4,248,613 A * 2/1981 Linhart ...................... 55/350.1
6,312,488 B1 * 11/2001 Fischer ...................... 55/315
6,491,734 B1 * 12/2002 Park ...................... 55/385.3
6,644,249 B1 * 11/2003 Itakura et al. .......... 123/198 E
6,692,552 B1 * 2/2004 Benham ...................... 55/315

FOREIGN PATENT DOCUMENTS

JP 5-34769 9/1993

* cited by examiner

*Primary Examiner*—Jason M. Greene
(74) *Attorney, Agent, or Firm*—Morgan Lewis & Bockius LLP

(57) ABSTRACT

The air pre-cleaner includes a housing, a drain valve, and an air exhaust pipe. The housing is provided with an air inlet. The drain valve is disposed in the housing and is configured to drain impurities separated from intake air entering the housing through the air inlet. The intake air is exhausted from the housing through the air exhaust pipe. An upper portion of the air exhaust pipe protrudes inside the housing, and the air exhaust pipe has a lateral section with a first end portion that is disposed near the air inlet that is sharper than an opposite portion thereof.

7 Claims, 7 Drawing Sheets

AIR PRE-CLEANER

CROSS-REFERENCE TO RELATED APPLICATION

This application claims priority of Korean Application No. 10-2003-0066539, filed Sep. 25, 2003, the disclosure of which is incorporated fully herein by reference.

FIELD OF THE INVENTION

The present invention relates to an air pre-cleaner for use in an air intake system of an engine.

BACKGROUND OF THE INVENTION

An air pre-cleaner is disposed upstream of an air cleaner, and is generally used for removing impurities from intake air. A conventional air pre-cleaner includes a housing and an air exhaust pipe that is mounted in the housing.

Further, a drain valve is provided in a lower portion of the housing, and the drain valve is configured to drain impurities in intake air.

Because the air exhaust pipes of conventional air pre-cleaners have an elliptical shape, the air flow speed around the air exhaust pipe is so high that impurities cannot effectively be removed from the intake air.

Furthermore, the housing of the air pre-cleaner has a stepped portion where a sectional area of the housing increases instantaneously. Therefore, an eddy flow is formed in the stepped portion of the housing, so that air flow in the housing of the air pre-cleaner becomes irregular.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide an air pre-cleaner that removes impurities from intake air more effectively, by improving the shapes of an air exhaust pipe and a housing.

In a preferred embodiment of the present invention, the air pre-cleaner comprises a housing, a drain valve, and an air exhaust pipe. The housing is provided with an air inlet. The drain valve is disposed in the housing and is configured to drain impurities separated from intake air entering the housing through the air inlet. The intake air is exhausted from the housing through the air exhaust pipe. An upper portion of the air exhaust pipe protrudes inside the housing. The air exhaust pipe has a lateral section with a first end portion that is disposed near the air inlet that is sharper (forms more of an apex) than an opposite portion thereof.

It is preferable that the housing is provided with a slanted portion where a sectional area of the housing gradually increases. It is further preferable that the slanted portion of the housing is positioned in a side of the first end portion of the air exhaust pipe.

Preferably, an upper surface of the air exhaust pipe is slanted such that the upper surface gradually lowers as it becomes farther from the air inlet. It is preferable that an upper surface of the housing is slanted such that the upper surface gradually lowers as it becomes farther from the air inlet. It is preferable that the drain valve is positioned farther from the air inlet than the air exhaust pipe. It is further preferable that the drain valve is positioned in a bottom surface of the housing.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

An air pre-cleaner 100 according to the preferred embodiment of the present invention is a device that removes impurities from intake air that flows into an engine (not shown).

Figure 1:
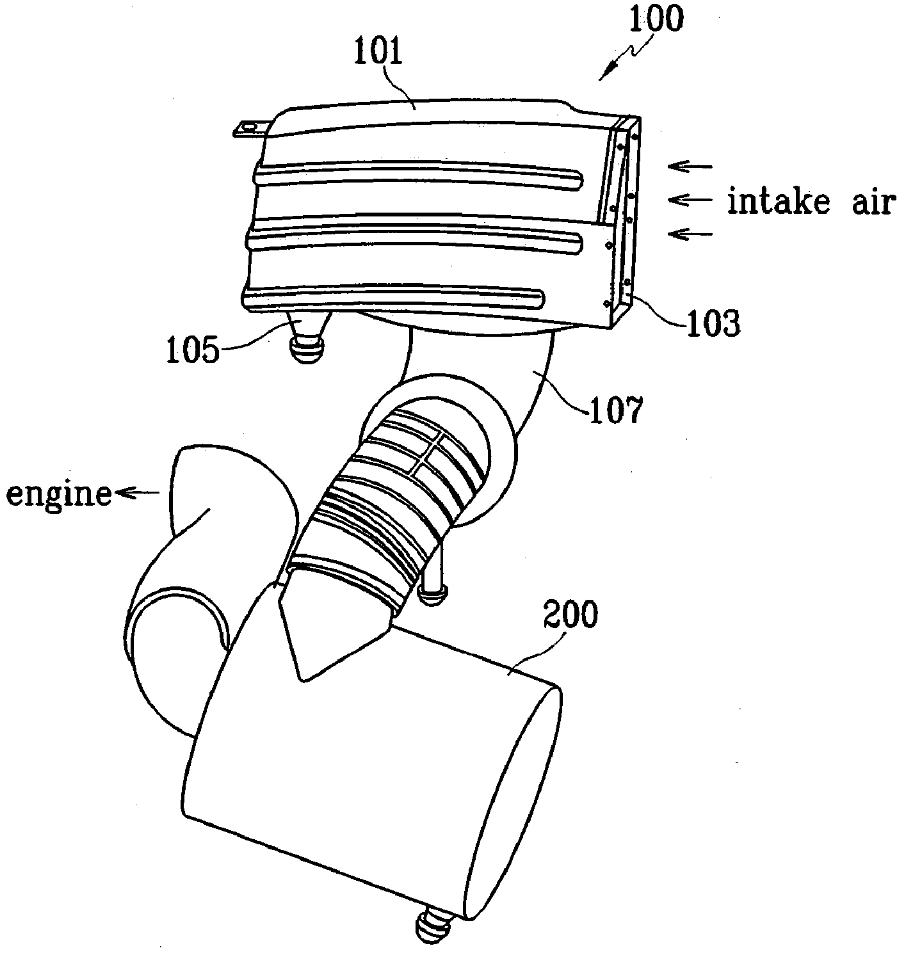
FIG. 1 shows the air pre-cleaner, according to the preferred embodiment of the present invention.

As shown in FIG. 1, the air pre-cleaner 100 is connected upstream of an air cleaner 200 that also removes impurities from intake air. That is, the intake air is first filtered by the air pre-cleaner 100, and is second filtered by the air cleaner 200. Then, the filtered intake air is supplied to the engine.

The air pre-cleaner 100 includes a housing 101 defining an inner space therein, and an air inlet 103 is formed in one side of the housing 101. Air is drawn into the housing 101 through the air inlet 103.

A drain valve 105 is disposed in the housing 101. The drain valve 105 is configured to drain impurities separated from intake air. An air outlet 107 is provided in the housing 101. After the impurities are removed from the intake air, the intake air is exhausted from the housing 101 through the air outlet 107.

Figure 2:
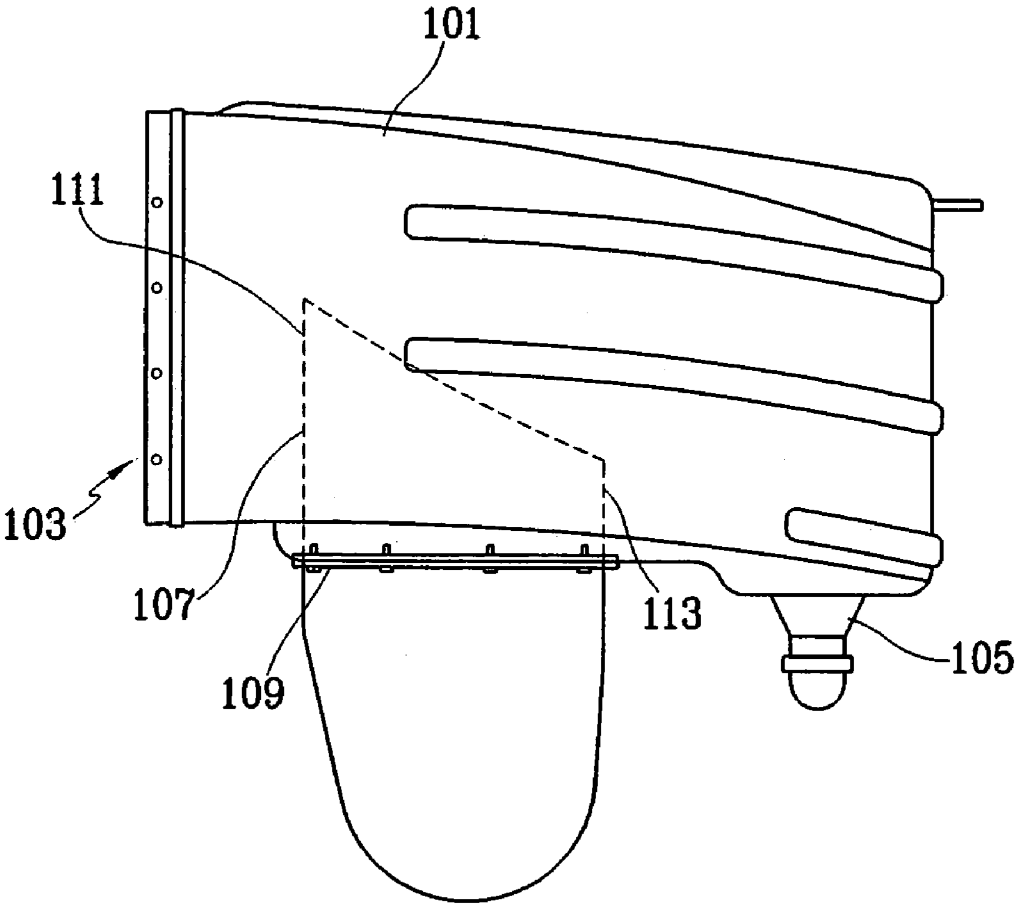
FIGS. 2 and 3 show structures of the air pre-cleaner, according to the preferred embodiment of the present invention.

As shown in FIG. 2, a flange portion 109 is provided at an outer periphery of the air exhaust pipe 107, and the air exhaust pipe 107 is coupled to the housing through the flange portion 109. An upper portion of the air exhaust pipe 107 protrudes into the inner space of the housing 101.

Figure 3:
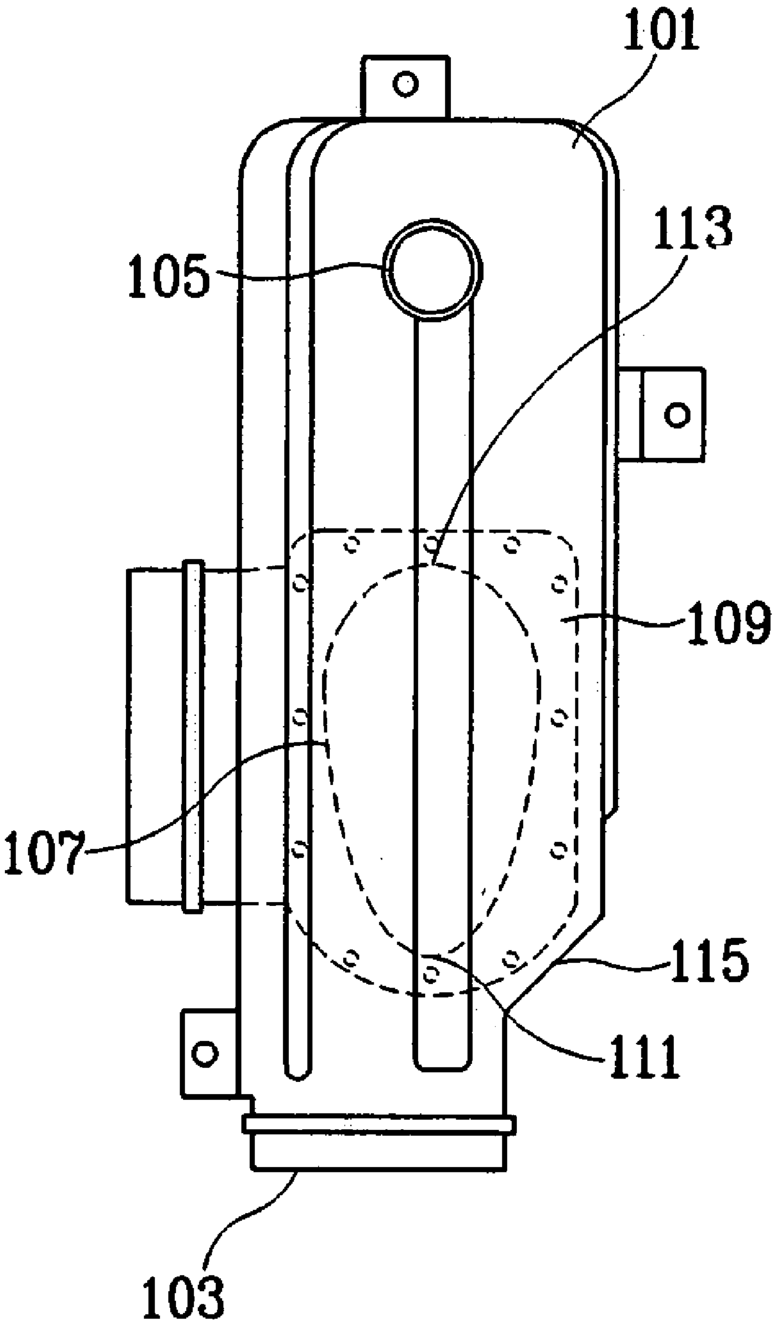

As shown in FIG. 3, the air exhaust pipe 107 has a lateral section with a first end portion that is disposed near the air inlet that forms more of an apex than an opposite (second) portion 113 thereof. That is, the first end portion 111 is tapered, so that a sectional area of the first end portion 111 of the air exhaust pipe 107 becomes less than that of the second end portion 113.

That is, when compared to an air exhaust pipe of the conventional air pre-cleaner, a sectional area of the air exhaust pipe 107 is decreased. Accordingly, a space through which intake air flow increases around the air exhaust pipe 107. So, a speed of the air flow is decreased, such that considerably more impurities can be separated from the intake air.

In addition, as shown in FIG. 3, a slanted portion 115, where a sectional area of the housing 101 gradually increases, is provided in the housing 101. Preferably, the slanted portion 115 is positioned at a side of the first end portion 111 of the air exhaust pipe 107.

Due to the slanted portion 115, formation of eddy flow of the intake air, caused by an instantaneous increase of the sectional area of the housing 101, can be suppressed. Consequently, air flow around the air exhaust pipe 107 becomes smoother.

Furthermore, an upper surface of the air exhaust pipe 107 is slanted such that the upper surface of the air exhaust pipe 107 near the air inlet 103 is highest and it gradually lowers as it becomes farther from the air inlet 103.

Referring again to FIG. 2, it is preferable that a height of the first end 111 of the air exhaust pipe 107 is approximately half of a height of the inner space of the housing 101. More concretely, it is preferable that the height of the first end 111 of the air exhaust pipe 107 is approximately 55% of the height of the inner apace of the housing 101. Therefore, the intake air can be easily transmitted to the drain valve 105 after passing through a space around the air exhaust pipe 107.

As shown in the drawings, it is preferable that the drain valve 105 is positioned farther from the air inlet 103 than the air exhaust pipe 107. The drain valve 105 is disposed in a bottom surface of the housing 101.

A conventional drain valve can be used as the drain valve 105. For example, the drain valve 105 includes a drain hole and a rib for covering the drain hole. The rib is incised into at least two parts such that it can be opened when impurities pile up on the rib. That is, the drain valve 105 is configured to open when a pressure inside the drain hole is higher than a specific value or impurities have accumulated in the drain hole.

As shown in FIG. 2, an upper surface of the housing 101 is slanted such that it gradually lowers as it becomes farther from the air inlet 103. Therefore, the intake air moves toward the drain valve 105 more effectively. That is, the intake air moves along the slanted upper surface of the hosing 101, so that the intake air reaches the drain valve more effectively.

Referring to FIGS. 4–9, air flow patterns in the housing acquired by computer analyses are shown.

Figure 4:
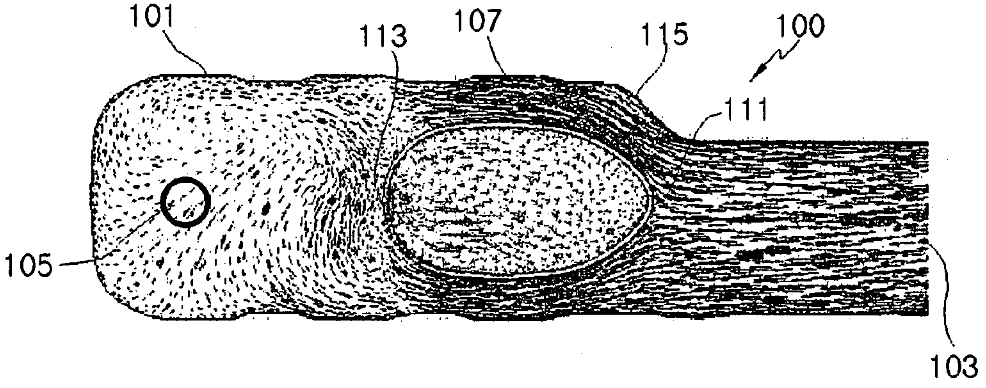
FIGS. 4 to 9 comparatively show air flow in the air pre-cleaners, according to the preferred embodiment of the present invention and according to the prior art.
Figure 5:
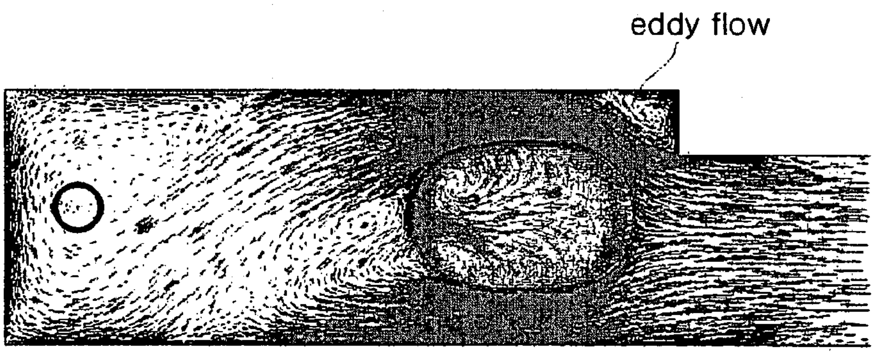
FIG.5(Prior Art)
Figure 6:
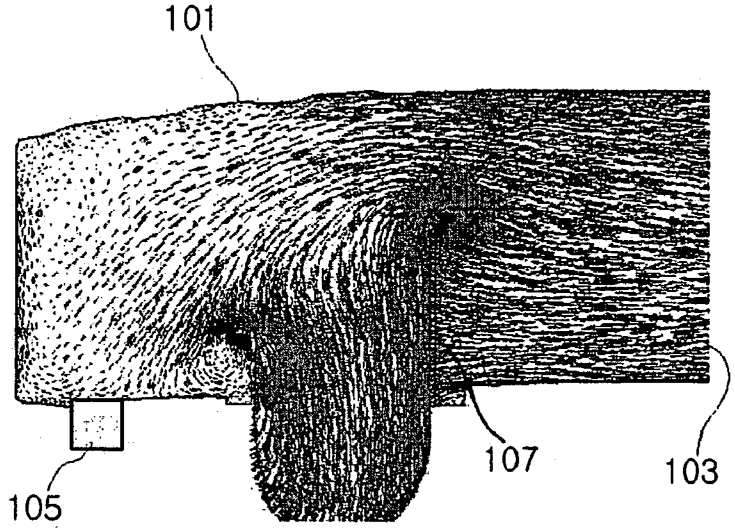
Figure 7:
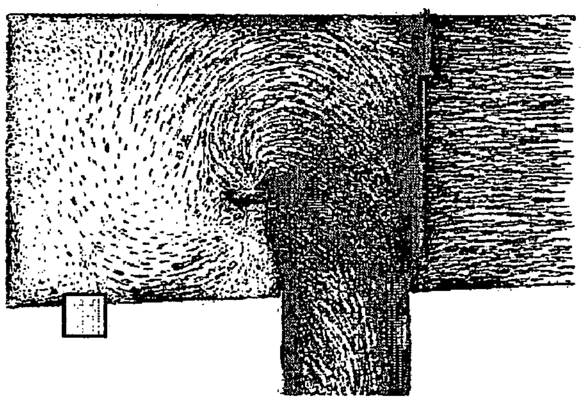
FIG.7(Prior Art)
Figure 8:
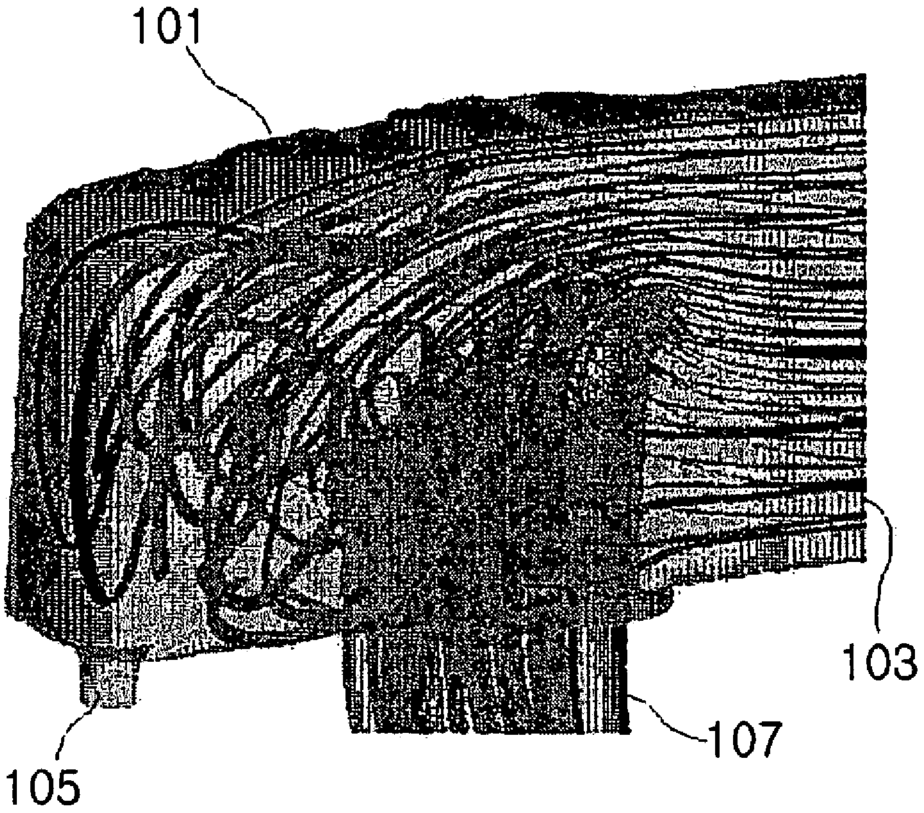
Figure 9:
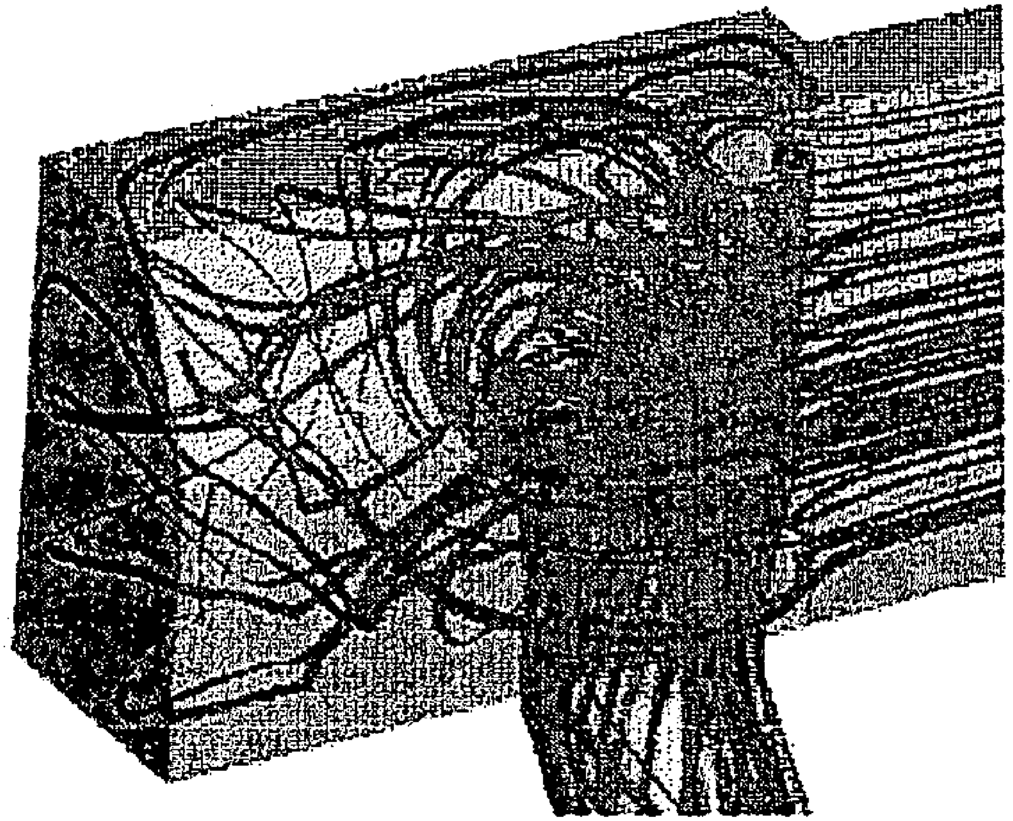
FIG.9(Prior Art)

FIGS. 4, 6, and 8 show the air flow in the air pre-cleaner according to the preferred embodiment of the present invention, and FIGS. 5, 7, and 9 show the air flow in a conventional air pre-cleaner.

As shown in FIGS. 4 and 5, the first end portion 111 of the air exhaust pipe 107 of the air pre-cleaner 100 is sharper (more of an apex) than the second end portion 113, so that the air flow in FIG. 4 becomes smoother. Furthermore, because the slanted portion 115 where the sectional area of the housing gradually increases is provided in the housing 101, the eddy current of the intake air flow can be prevented.

Consequently, in the air pre-cleaner 100 according to the preferred embodiment of the present invention, an amount of air flow passing the drain valve 105 increases.

Further, because the height of the first end portion 111 of the air exhaust pipe 107 is about half of the height of the inner space of the housing as shown in FIG. 6, the intake air flow becomes smoother and an amount of air flow passing the drain valve 105 increases as compared to FIG. 7.

Consequently, as shown in FIGS. 8 and 9, the air flow in the air pre-cleaner 100, according to the preferred embodiment of the present invention, is smoother and the amount of the intake air reaching the drain valve 105 is greater, when compared to the air flow in conventional air pre-cleaners.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

According to the preferred embodiment of the present invention, the speed of the air flow around the air exhaust pipe is relatively slow, and the air flow around the air exhaust pipe is relatively smooth. Therefore, impurities can be effectively separated from the intake air. Furthermore, because the slanted portion is provided in the housing, the eddy current of the intake air flow can be prevented.

What is claimed is:

1. An air pre-cleaner comprising:

a housing provided with an air inlet;

a drain valve disposed in the housing and configured to drain impurities separated from intake air entering the housing through the air inlet; and an air exhaust pipe through which the intake air is exhausted from the housing, wherein an upper portion of the air exhaust pipe protrudes inside the housing, and the air exhaust pipe has a lateral section with a first end portion that is disposed near the air inlet that defines more of an apex than an opposite portion thereof.

2. The air pre-cleaner of claim 1, wherein the housing is provided with a slanted portion where a sectional area of the housing gradually increases.

3. The air pre-cleaner of claim 2, wherein the slanted portion of the housing is positioned at a side of the first end portion of the air exhaust pipe.

4. The air pre-cleaner of claim 1, wherein an upper surface of the air exhaust pipe is slanted such that the upper surface gradually lowers as it becomes farther from the air inlet.

5. The air pre-cleaner of claim 1, wherein an upper surface of the housing is slanted such that the upper surface gradually lowers as it becomes farther from the air inlet.

6. The air pre-cleaner of claim 1, wherein the drain valve is positioned farther from the air inlet than the air exhaust pipe.

7. The air pre-cleaner of claim 6, wherein the drain valve is positioned in a bottom surface of the housing.

* * * * *